Patented Oct. 3, 1933

1,929,121

UNITED STATES PATENT OFFICE 1,929,121

PROCESS FOR THE PREPARATION OF AMMONIUM PERBORATE

Rudolf Seng, Frankfort-on-the-Main, Germany, assignor, by mesne assignments, to E. I. du Pont de Nemours and Company, a corporation of Delaware No Drawing. Application August 12, 1930, Serial No. 474,885, and in Germany August 20, 1929

2 Claims. (Cl. 23—60)

This invention relates to the preparation of per-salts of ammonia and more particularly to the preparation of ammonium perborate.

It has previously been proposed to prepare ammonium perborate by dissolving boric acid in dilute solutions containing hydrogen peroxide and thereafter to add ammonia to bring about the formation of ammonium per salts. These salts are then precipitated with alcohol. The product is washed with alcohol and ether. A product consisting of ammonium perborate with water of crystallization is obtained. This method gives unsatisfactory yields and the use of alcohol and ether is costly. Moreover, the recovery of these organic liquids is beset with difficulty since the peroxide containing alcohol and ether, if distilled, is explosive.

One object of this invention is to devise a method whereby ammonium perborate can be obtained by a simple procedure which eliminates the use of costly organic precipitants and removes the difficulty and danger attendant upon their use. Another object of the invention is to prepare ammonium perborate in purified condition and having a high content of active oxygen.

It has now been found that ammonium perborate can be prepared by the direct addition of boric acid to high percentage peroxide solutions and the rapid introduction of gaseous ammonia into the mixture. The ammonium perborate precipitates in readily filterable form. The product contains a high percentage of active oxygen and the process is comparatively inexpensive.

In my process, boric acid is added to a 30% hydrogen peroxide solution, and preferably with stirring, ammonia gas is introduced into the cooled mixture. The boric acid and hydrogen peroxide are used in substantially molecular proportions. The boric acid dissolves without difficulty and the formation of a soluble form of ammonium perborate begins. Very soon after the theoretical quantity of ammonia has been added, the perborate precipitates out in readily filterable, crystalline form. Its separation is complete for all practical purposes as soon as ammonia is present in excess over that required by theory to form ammonium perborate. The solution has a strong odor of ammonia at this point.

The process should be carried out with due regard to the increased temperature which accompanies the reaction, since the volatility of the ammonia as well as the decreased solubility of the perborate at lower temperatures, will, in general, require cooling. It is advantageous to conduct the reaction at temperatures around 0° C. or thereunder. It should be pointed out, however, that these exact temperature limits, although advantageous, are not an essential feature of the process since the reaction will take place and some ammonium perborate will be formed at somewhat higher temperatures.

To obtain the best product, it is desirable to avoid the presence of catalysts which act to decompose the perborate. Hence, it is desirable to employ boric acid in pure form, recrystallized boric acid, for example, has been found to give best results. It has also been found that dried boric acid is better than the moist variety. By the application of an especially pure, dry boric acid, ammonium perborate which contains more than 20% active oxygen can be obtained.

The following example will more specifically illustrate the invention. It will be understood that this example which shows a preferred embodiment of this invention, can be varied and hence should not be taken as limiting the invention.

*Example*

300 grams of boric acid was added to 570 grams of 30% hydrogen peroxide solution cooled to about 5° C. 85 grams of ammonia gas was then introduced into the mixture while care was being exercised to prevent the temperature from rising above 10° C. The solution so obtained was clear and while agitating and cooling, an additional quantity of ammonia was introduced. Almost immediately the ammonium perborate began to precipitate. When the solution had a strong odor of ammonia, (this was found to occur when about 30 to 50 grams of ammonia, i. e. about a 50% excess, in addition to that first added, was introduced), the introduction of ammonia was interrupted and the mixture cooled to around 0° C. The product, consisting of crystals of ammonia perborate, was filtered by suction from the solution and thereafter dried in the air. 393 grams of a salt corresponding to the formula $NH_4BO_3.1/2H_2O$ containing about 18.5% active oxygen was obtained.

The motor liquor which is obtained from the process, can be again used for carrying out the operation if sufficiently pure starting materials have been employed.

In general it is desirable in carrying out the process to employ only a small excess of ammonia over that theoretically required to produce the ammonium perborate and concentrated hydrogen peroxide solutions are preferable, for example, 30% hydrogen peroxide; it is also advantageous to introduce the ammonia in the form of a gas. Naturally, however, one can employ a larger excess of ammonia and one may also use weaker hydrogen peroxide solutions. Under these conditions it is necessary to increase the amount of ammonia employed, as the amount of hydrogen peroxide used is decreased. Thus, throughout the specification and the appended claims, wherever reference is made to an excess of ammonia, this is to be taken as meaning any amount of ammonia above that necessary to form ammonium perborate with the other reactants added.

In certain cases, the added quantities of ammonia can be so measured that only part of the perborate formed precipitates, and the precipitation of additional portions, or of the final residuum can be carried out in a second stage of precipitation. This has its advantages, since, if the starting materials are not entirely pure, the initial portions of perborate are more stable and will, after storage, show a higher percentage of active oxygen than the final portions and it is thus possible to grade the product formed.

It is also possible to carry out the operation continuously. This can be done by carrying out the initial operation of mixing the boric acid with peroxide and adding the primary quantities of ammonia in one container; thereafter the solution is led to a second container or to additional containers for precipitation in one or several stages. The ammonia added during these several stages is regulated according to the desired results. The mother liquor, after purification if necessary may be reintroduced in the system where desired.

Having now particularly described my invention, what I desire to claim is:

1. Process for the preparation of ammonium perborate comprising adding substantially molecular proportions of boric acid to a concentrated aqueous solution of hydrogen peroxide containing about 30% or more by weight of hydrogen peroxide, passing in gaseous ammonia in excess of that theoretically required to form ammonium perborate with the other reactants, while maintaining the mixture at a temperature below about 10° C. and separating and collecting the ammonium perborate formed.

2. Process for the preparation of ammonium perborate comprising adding substantially molecular proportions of boric acid to an aqueous solution containing about 30% by weight of hydrogen peroxide, stirring and maintaining the mixture at a temperature between about 0° C. and 10° C. while introducing an excess of ammonia gas into the mixture, and separating and collecting the ammonium perborate obtained.

RUDOLF SENG.